Jan. 6, 1942.   A. EISELE   2,268,579
GAUGE
Filed Feb. 14, 1940   2 Sheets-Sheet 1
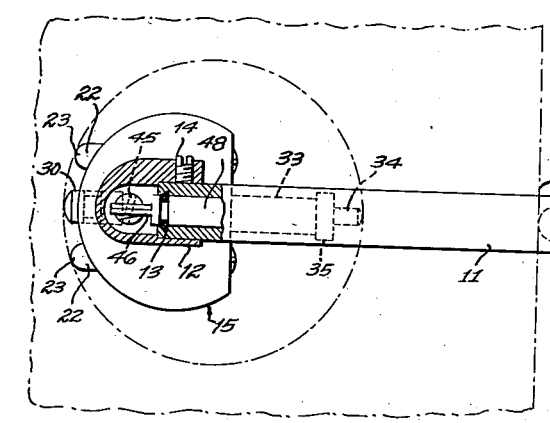
Fig.1.
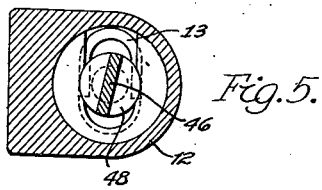
Fig.5.
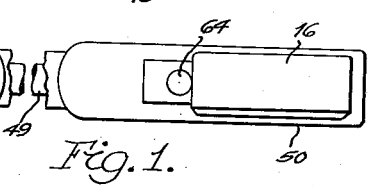
Fig.8. Fig.6.
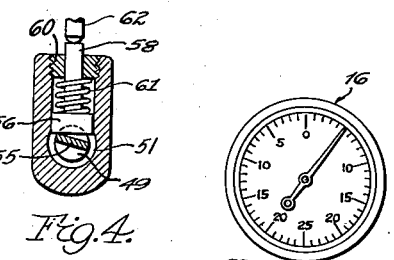
Fig.7. Fig.4.
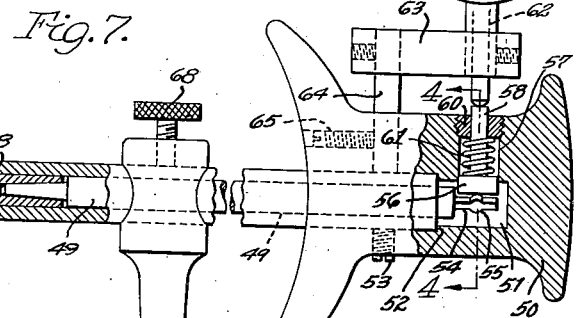
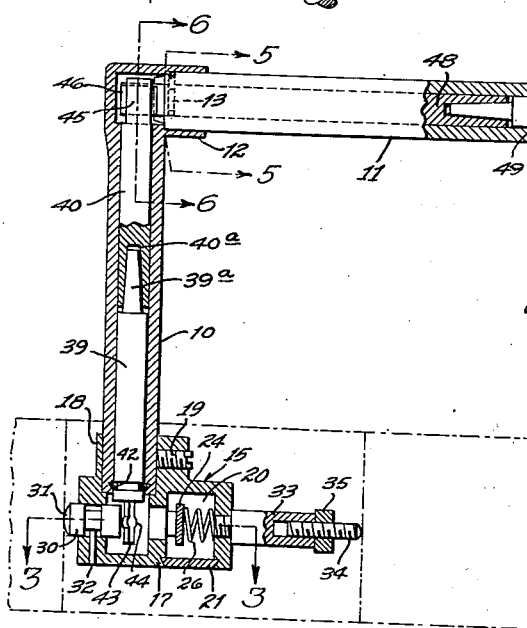
Fig.2.
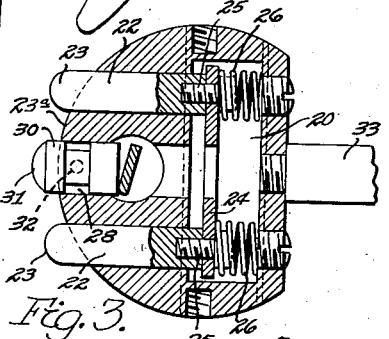
Fig.3.
Inventor
Andrew Eisele
By
Attorneys Jan. 6, 1942. A. EISELE 2,268,579
GAUGE
Filed Feb. 14, 1940 2 Sheets-Sheet 2
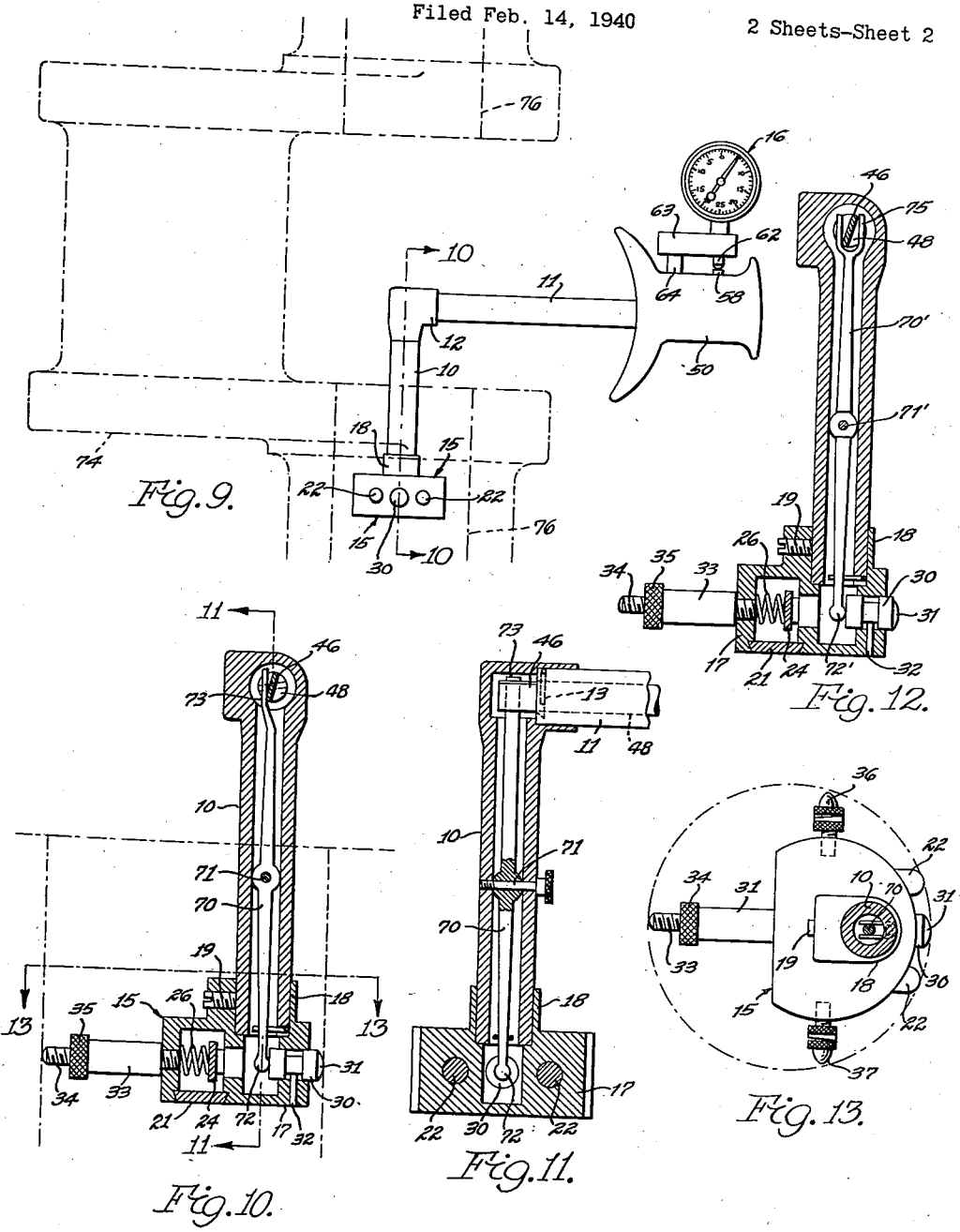
Inventor
Andrew Eisele
By
Attorneys Patented Jan. 6, 1942

2,268,579

UNITED STATES PATENT OFFICE 2,268,579

GAUGE

Andrew Eisele, Detroit, Mich.

Application February 14, 1940, Serial No. 318,791

7 Claims. (Cl. 33—147)

This invention relates generally to gauges and more particularly to gauges for testing or checking the uniformity of bores and other dimensions.

This application is a continuation-in-part of my pending application, Serial No. 212,649, filed June 9, 1938, for Gauges.

It is an object of the present invention to provide a new and improved internal caliper gauge for testing bores which are difficult to reach, such as where there is limited space at the bore opening or where some obstruction such as a web or flange makes it difficult to insert the ordinary gauge in the bore.

Another object of the invention is to provide a new and improved gauge which is adapted for checking the accuracy of a bore and also for checking the distances between bores or apertures or the distance from a surface to an aperture.

Another object of the invention is to provide a new and improved internal caliper gauge having adjustments for overcoming various obstacles encountered in obtaining access to bores.

Other objects of the invention will become apparent from the following detailed description taken in connection with the accompanying drawings in which:

Figure 1 is a top view shown partly in elevation and partly in section of the gauge and illustrating its use in checking the accuracy of a bore;

Fig. 2 is a side view of the gauge having parts broken away and in section;

Fig. 3 is a sectional view of part of the gauge, taken along the line and in the direction of the arrows 3—3 of Fig. 2;

Fig. 4 is a view shown in cross section of the gauge, taken along the line and in the direction of the arrows 4—4 of Fig. 2;

Fig. 5 is a cross sectional view of the gauge, taken along the line and in the direction of the arrows 5—5 of Fig. 2;

Fig. 6 is a cross sectional view of the gauge, taken along the line 6—6 of Fig. 2;

Fig. 7 is a view in perspective of a part of the gauge shown removed therefrom;

Fig. 8 is a sectional view showing a modification of the structure shown in Fig. 6;

Fig. 9 is a view in side elevation of the gauge and showing how the gauge is adapted for checking bores in parts where it is difficult to get into the bore because of limited space before the bore opening;

Fig. 10 is a vertical sectional view of the gauge, taken along the line and in the direction of the arrows 10—10 of Fig. 9;

Fig. 11 is a vertical sectional view of the gauge, taken along the line 11—11 of Fig. 10;

Fig. 12 is a vertical sectional view of a modified structure of the gauge of Fig. 10; and Fig. 13 is a view partly in elevation and partly in section of the gauge, taken along the line and in the direction of the arrows 13—13 of Fig. 10.

Referring to the drawings by characters of reference, the present internal caliper gauge includes a substantially hollow support comprising a pair of connected, relatively rotatable tubes 10 and 11, the tube 10 extending transversely of or substantially at right angles to the tube 11. Adjacent one or its upper end, as seen in Fig. 2, the tube 10 is provided with an external, laterally extending hollow boss 12 in which is received an end portion of the tube 11, the boss 12 and the tube 11 being provided respectively with internal and external aligning or opposed annular grooves in which is sprung a U-shaped spring wire retainer 13 which permits adjustment of the position of the tube 10 about the axis of the tube 11 but prevents any other relative movement between the tubes. The tube 10 may be rigidly held to the tube 11 in any desired adjusted position by means of a set screw 14, see Fig. 1.

Mounted on the free or lower end of the tube 10 there is an operating member or feeler, designated in general by the numeral 15, for positioning in a bore to be checked, and mounted on the free or outer end of the tube 11 there is an indicator 16 which is operatively connected to the operating member or feeler 15 by means hereinafter described in detail. Referring first to the operating member 15, a body or casing 17 is provided with an external hollow boss 18 in which is received a lower end portion of the tube 10, and the body 17 may be rigidly secured to the tube 10 by a set screw 19 or by other suitable means. The body 17 is further provided with a chamber 20 which is closed by a removable closure plate 21 which may be dove-tailed to the body or may be held thereto in any other suitable manner. In the body 17, a pair of spaced, substantially parallel bores slidably receive and guide a pair of guide or locating pins 22 which have outer rounded ends 23 projecting beyond or past a cylindrical outer side wall surface 23a of the body 17 for engaging the wall surface of a bore to be checked. The inner ends of the pins 22 project into the body chamber and are rigidly secured together by a connecting plate 24 by screws 25 so that the pins 22 will move together, A pair of helical coil springs 26, in the chamber 20, have ends thereof abutting the connecting plate 24 and their other ends abutting one of the walls of said chamber, the springs 26 urging the pins 22 outwardly. The ends of the springs abutting the connecting plate 24 may fit over the heads of the screws 25 which thus prevent lateral displacement of the springs.

The body 17 is provided with another bore 28 which extends between and is parallel to the pins 22, the bore 28 opening through the cylindrical surface 23a of the body 17. Slidably received and guided in the bore 28 there is a feeler or operating member in the form of a pin 30 having a rounded outer end 31 for engaging the wall surface of a bore to be checked. Intermediate its ends, the pin 30 is provided with an annular groove providing opposed shoulders between which project one end of a stop pin 32 for limiting movement of the pin 30 in opposite directions. An extension member 33, in alignment with and extending in the opposite direction from the pin 30, has one end screwthreaded into the casing body 17, and adjustably screwthreaded into the other or outer end of the extension there is a screw 34 having a rounded outer end for engaging the wall surface of a bore to be checked. After adjustment of the abutment screw 34, a lock nut 35 threaded thereon may be tightened down against the outer end of the extension to prevent the screw from getting out of adjustment. Extending at right angles to the extension 33, a pair of additional extensions 36 and 37, see Fig. 13, may be provided for engaging the wall surface of the bore being checked.

Rotatably mounted in the tube 10 there is a sectional rod or connecting member comprising two sections 39 and 40, the section 39 having a tapered end portion 39a adapted to wedge tightly into a tapered recess 40a in one end of the rod 40 to secure the rods tightly together. The rod section 39 is provided with an annular groove, and the inner wall of the tube 10 is provided with a similar internal groove, in which groove a U-shaped retaining clip 42 is sprung into place and prevents longitudinal movement of the sectional rod. One or the lower end of the rod section 39 projects into the body 17 and is provided with a flattened end portion 43 having laterally and oppositely extending ears 44 providing cam means or lever arms. The rod sections 39 and 40 are fitted together such that the flattened end portion 43 of the rod section 39 is at an angle to the inner flat surfaced end of the feeler member or pin 30 which engages one of the ears 44 and rotates the sectional rod in accordance with any irregularities in a surface engaged by the outer rounded end 31 of the movable pin 30. The other or upper end of the rod section 40 is provided with a flattened portion 45 which engages a similar flattened portion 46 on a sectional rod which is rotatably mounted in the tube 11. The engaging flattened rod portions 45 and 46 are relatively angularly disposed and provide for transmission of rotary motion of the rod in shaft 10 to the rod in shaft 11. The rod in shaft 11, like the rod in shaft 10, is made in two sections 48 and 49 which are tightly wedged together, the purpose of making the rods in separable sections being so that they can be relatively adjusted to position the flattened end portions at different or desired angles in accordance, for example, with the position of adjustment of the tube 10 with respect to the tube 11. In Fig. 6 the flattened end portion 45 is provided by cutting away material from the rod, back past the longitudinal center thereof, since the flattened end portion 46 of the rod section 48 is centrally disposed with respect to the longitudinal axis of the rod 48. In the modification of Fig. 8., the flattened end portion 45' is formed by cutting the material, back to the longitudinal axis of the rod section 40', and with this construction the rod section 48 is offset from the center of its tube 11, as shown, in order to obtain transmission of rotary motion from the rod 40' to the rod 48.

A handle 50 is provided with a bored recess 51 having a counterbore in which is received an outer end portion of the tube 11, the end of which abuts an internal outwardly facing shoulder 52 formed in the handle by the counterbore. A set screw 53 may be provided for rigidly securing the handle 50 to the tube 11. One end of the rod section 49 extends into the handle bore 51 and is provided with a flattened end portion 54 which is the same as the flattened end portion 43, having laterally extending ears 55. One of the ears 55 abuts the lower end of a plunger or pin 56 which is slidably received and guided in a bore 57 which intersects the handle bore 51 transversely thereof. The plunger 56 has an upwardly directed stem 58 which is slidably received and guided in a bore through a plug 60 which is screwthreaded into the upper end of the handle bore 57. Surrounding the plunger stem 58, within the bore 57, there is a helical coil spring 61 which maintains the plunger in contact with one of the ears 55 of the rod section 49. The outer end of the plunger stem 58 abuts the lower end of an operating plunger 62 of the indicator 16. The indicator 16 is mounted on a rod 64, the rod 64 fitting into a bore in the handle 50 and being secured to the handle by a set screw 65. Any suitable type of indicator may be used, the indicator shown having a dial and pointer in a casing wherein a light spring is adapted to return the pointer to a zero mark.

Mounted on and depending from the tube 11, there is a stop member 66 for use where it is desired to check the distance from a surface, as at 67, to the wall of an aperture, bore or slot or where it is desired to check the distance between two apertures. The stop member 66 is slidably adjustable along the tube 11 and may be held in any adjusted position by a thumb set screw 68.

The modification shown in Figs. 10 and 11 differs from the above described device in that instead of having a rotatable rod in the tube 10 there is a lever 70 which is pivoted intermediate its ends to the tube 10 by a pin 71. The lower end of the lever 70 is preferably rounded, as at 72, and abuts the inner flat surfaced end of the operating member or feeler 30. The upper end of the lever 70 is offset as at 73, for engaging an edge of the flattened end portion 46 of the rod section 48 and in position to rotate the rod upon movement of the operating member 30 or to transfer rectilinear movement of the operating member 30 to rotary movement of the rod in tube 11. In this modification, if it is desired to rotate the rod 48 in the opposite direction, the pin 71 may be removed and the lever reversed such that the lever offset 73 engages the other or upper edge of the flattened portion 46. In the modification of Fig. 12 the upper end of the lever 70' is provided with a yoke or is bifurcated, as at 75, to provide for rotation of the rod 48 in either direction without the necessity of reversing the lever 70'.

In Fig. 2 the gauge is shown in position for checking the distance between an aperture or bore and the surface 67. The correct distance between the surface 67 and a point on the surface of the bore on a line normal to the surface 67 is, of course, known. Accordingly, the stop member 66 is set or adjusted on the tube 11 such that the distance between the point of contact or the lower rounded end of the stop 66 which engages the surface or face 67 and the outer end of the operating member 30 is equal to said correct distance or measurement. Consequently, when the gauge is applied to the bore, if the measurement being checked is less than it should be, the operating members 30 will be depressed. This will rotate the sectional rod composed of the sections 39 and 40 which will in turn rotate the sectional rods 48 and 49. As the flattened portion 54 of the rod section 49 rotates, it will lift the plunger 56 which will raise the indicator plunger 62 and register the discrepancy on the indicator dial. The dial showing will indicate how much metal should be removed from the face 67 to obtain the desired or correct dimension therefrom to the bore. It is to be understood that the stop member 66 is not employed when checking the accuracy or uniformity of a bore but instead is employed in checking or measuring the distance between spaced wall surfaces.

In Fig. 9 is illustrated how the present internal caliper gauge, having a right angle support, is adapted for checking bores having limited space in advance of the bore opening, for example, in checking the bores 76 in a crank shaft 74. By reason of the right angle support comprising the relatively rotatable tubes 10 and 11, it will be seen that the gauge operating or feeler mechanism 15 may be inserted into a bore of the crankshaft, and it will be appreciated that by adjusting the position of the tube 10 about the longitudinal axis of the tube 11 the gauge may be used at various angles to avoid many obstructions that might be encountered by the checker.

While I have shown and described my invention in detail, it is to be understood that the same is to be limited only by the appended claims for many changes may be made in the structure without departing from the spirit and scope of the invention.

What I claim is:

1. An internal caliper gauge for testing the accuracy of a bore comprising, a substantially right angle hollow support, an indicator mounted on said support adjacent one end thereof, a rotatable rod in one portion of said right angle support and at one end thereof having a flattened end portion providing cam means for actuating said indicator, a follower member operatively connecting said flattened portion and said indicator, a second rod rotatably mounted in the other portion of said right angle support, said second-named rod having a flattened end portion engageable with a flattened portion on the other end of said first-named rod for rotating the same, and movable feeler member mounted on said support adjacent the other end thereof and engageable with a flattened portion of the other end of said second-named rod for rotating said second-named rod.

2. A gauge comprising an elongated hollow support having relatively and substantially right angle end portions, a movable feeler member mounted on one end of said support, an indicator mounted on the other end of said support and having operating means, a rotatable rod in one of said end portions and at one end thereof having means operable by rotation of said rod to actuate said indicator, a rotatable rod in the other of said end portions and having means on one end thereof cooperable with means on the other end of said first-named rod for rotating the latter upon rotation of said second-named rod, and means on the other end of said second-named rod cooperable with said feeler member for rotating said second-named rod.

3. An internal caliper gauge for testing the accuracy of a bore, a substantially right angle hollow support, an indicator mounted on and adjacent one end of said support, a rotatable rod in one portion of said support and having each of its ends provided with a planar surface, a second rotatable rod in the other portion of said support and having each of its ends also provided with a planar surface, follower means operatively interconnecting said indicator and one of said surfaces on said first rod and responsive to rotation of the latter for actuating said indicator, the other of said surfaces on said first rod and one of said surfaces on said second rod being operatively interconnected so that rotation of said second rod effectuates rotation of said first rod, and a movable feeler mounted on and adjacent the opposite end of said support and operatively connected to the other of said surfaces on said second rod for rotating the latter.

4. An internal caliper gauge for testing the accuracy of a bore, a substantially right angle hollow support, an indicator mounted on and adjacent one end of said support, a rotatable rod in one portion of said support and having each of its ends provided with a planar surface, a second rotatable rod in the other portion of said support and having each of its ends also provided with a planar surface, follower means operatively interconnecting said indicator and one of said surfaces on said first rod and responsive to rotation of the latter for actuating said indicator, the other of said surfaces on said first rod and one of said surfaces on said second rod occupying planes angularly related one to the other and being operatively interconnected so that rotation of said second rod effectuates rotation of said first rod, and a movable feeler mounted on and adjacent the opposite end of said support and operatively connected to the other of said surfaces on said second rod for rotating the latter.

5. An internal caliper gauge for testing the accuracy of a bore, a substantially right angle hollow support, an indicator mounted on and adjacent one end of said support, a rotatable rod in one portion of said support and having each of its ends provided with a planar surface, a second rotatable rod in the other portion of said support and having each of its ends also provided with a planar surface, follower means operatively interconnecting said indicator and one of said surfaces on said first rod and responsive to rotation of the latter for actuating said indicator, the other of said surfaces on said first rod and one of said surfaces on said second rod occupying planes angularly related one to the other and being operatively interconnected so that rotation of said second rod effectuates rotation of said first rod, a movable feeler mounted on and adjacent the opposite end of said support and operatively connected to the other of said surfaces on said second rod for rotating the latter, and means carried by at least one of said rods for selectively varying said angular relation between said planes.

6. A gauge comprising an elongated hollow support having relatively and substantially right angle end portions, a movable feeler member mounted on one of said portions, an indicator mounted on the other of said portions and having operating means, rotatable rod means having a pair of interconnected sections in one of said portions and having means at one end of one of said sections operable by rotation of said rod means to actuate said indicator operating means, second rotatable rod means also having a pair of interconnected sections in the other of said portions and having means at one end of one of said second pair of sections cooperable with means on one end of the other of said first pair of sections for rotating said first rod means upon rotation of said second rod means, and means on one end of the other of said second pair of sections cooperable with said feeler member for rotating said second rod means.

7. A gauge comprising an elongated hollow support having relatively and substantially right angle end portions, a movable feeler member mounted on one of said portions, an indicator mounted on the other of said portions and having operating means, rotatable rod means having a pair of interconnected sections in one of said portions and having means at one end of one of said sections operable by rotation of said rod means to actuate said indicator operating means, second rotatable rod means also having a pair of interconnected sections in the other of said portions and having means at one end of one of said second pair of sections cooperable with means on one end of the other of said first pair of sections for rotating said first rod means upon rotation of said second rod means, means on one end of the other of said second pair of sections cooperable with said feeler member for rotating said second rod means, and means carried by at least one of said rod means whereby its sections may be selectively rotated relatively one to the other.

ANDREW EISELE.